United States Patent [19]

Sauer et al.

[11] 4,440,275
[45] Apr. 3, 1984

[54] CHECK VALVE FOR AUTOMOTIVE BRAKING SYSTEM

[75] Inventors: Herbert Sauer, Pfarrweisach; Günter Gütlein, Ebern, both of Fed. Rep. of Germany

[73] Assignee: Fag Kugelfischer Georg Schäfer & Co., Schweinfurt, Fed. Rep. of Germany

[21] Appl. No.: 308,111

[22] Filed: Oct. 2, 1981

[30] Foreign Application Priority Data

Oct. 4, 1980 [DE] Fed. Rep. of Germany ....... 3037569

[51] Int. Cl.³ .............................................. B60T 11/28
[52] U.S. Cl. ..................................... 188/352; 137/599
[58] Field of Search ................... 188/352, 345, 151 A, 188/357; 60/584, 453; 137/599, 599.2; 303/84 R, 84 A, 24 R, 86, 24 A, 75–79; 141/291

[56] References Cited

U.S. PATENT DOCUMENTS

| | | | |
|---|---|---|---|
| 2,649,692 | 8/1953 | Stelzer | 188/352 X |
| 4,017,329 | 4/1977 | Larson | 188/352 X |
| 4,116,493 | 9/1978 | Hayashida | 303/24 A |

OTHER PUBLICATIONS

"Brake Handbook" ("Bremshandbuch"), 5th Edition, 1977, Pubished by Bartsch Verlag of Ottobrunn, West Germany, p. 27, FIGS. 7–18.

*Primary Examiner*—Douglas C. Butler
*Attorney, Agent, or Firm*—Karl F. Ross; Herbert Dubno

[57] ABSTRACT

A check valve in an automotive braking system between the master cylinder and a wheel cylinder includes a screw or a piston mounted in the check-valve housing for overriding or opening the valve prior to a charging or filling operation to facilitate an evacuation of air from the system. A flow-regulating assembly in the valve includes an annular sealing disk biased by a restoring spring into a fluid-tight contact with an annular valve seat. Another restoring spring mounted in the housing in opposition to the first spring biases a spherical plug into a fluid-tight contact with an inner rim of the disk, this disk being mounted in a cup-shaped extension of a hollow shaft. In one embodiment the shaft extends from the flow-regulating assembly to the override screw; upon an inward shift the screw engages the free end of the shaft and thereby pivots the same and the sealing disk about a point on the valve seat. In another embodiment a tube traverses the shaft and the disk to engage the spherical plug and unseat the same from the inner rim of the disk in opposition to the force exerted by the second spring; the tube shifts longitudinally in response to an inward motion of the screw or piston, the same being provided with a fructoconical camming surface engaging the end of the tube opposite the spherical plug.

10 Claims, 6 Drawing Figures

CHECK VALVE FOR AUTOMOTIVE BRAKING SYSTEM

FIELD OF THE INVENTION

Our present invention relates to a check valve in the hydraulic braking system of an automotive vehicle between the master cylinder and at least one wheel cylinder.

BACKGROUND OF THE INVENTION

In automotive vehicles equipped at one axle with disk brakes and at the other axle with brake shoes and drums, a check valve is required for the brake-shoe pressure lines in order to maintain a minimum pressure therein. The check valve includes a disk held by a spring against a sealing surface, as illustrated on page 27, FIGS. 7 and 8, of the German-language "Brake Handbook" ("Bremshandbuch"), 5th edition, 1977, published by the Bartsch Verlag of Ottobrunn, West Germany.

Such check valves are operable if the hydraulic system in which they are disposed contains only fluid, i.e. is substantially devoid of air. Generally, during a charging or filling operation, brake fluid is permitted to flow through the hydraulic system for such a time as to ensure removal of practically all the air from the cylinders and pressure-transmission conduits. Disadvantages of this method of air discharge are the amount of time and the quantity of brake fluid involved.

Another method of charging an automotive braking system with force-transmitting fluid comprises the steps of depressurizing the system to approximately 5 millibars absolute pressure and then filling the system with brake fluid subjected to 2.5 bars absolute pressure. Such a procedure for charging a braking system requires less time and a smaller quantity of brake fluid than methods merely using gravity to remove air and force brake fluid into all branches of the system. However, conventional valves pose a problem to this otherwise more efficient method of charging automotive braking systems. The spring-loaded sealing disks of conventional valves prevent peripheral parts of the braking system from being evacuated. A connection of a vacuum pump to the master cylinder results only in the evacuation of that portion of the system extending from the master cylinder to the check valves. In the wheel cylinders and the conduits between the check valves and the wheels, air remains at a normal pressure level during the depressurization of the master cylinder, thereby hindering a complete filling of the braking system with fluid.

OBJECT OF THE INVENTION

The object of our present invention is to provide a simple check valve for use in automotive braking systems in which an air evacuation is effectuated prior to a charging of the system with brake fluid, such a check valve obviating the above-mentioned disadvantages.

SUMMARY OF THE INVENTION

A hydraulic braking system in an automotive vehicle includes a master cylinder connected to wheel cylinders and a brake pedal for enabling the pressurization of the master cylinder by an operator. A check valve inserted between the master cylinder and at least one wheel cylinder in such a system comprises, according to our present invention, a valve housing, linking conduits for connecting one end of the housing to the master cylinder and another end of the housing to the wheel cylinder, a flow-regulating assembly in the housing for permitting the flow of brake fluid from the master cylinder to the wheel cylinder during a braking stroke of the pedal and for partially blocking a return flow of fluid from the wheel cylinder to the master cylinder upon a release of the pedal, and a valve-override in the housing engageable with the flow-regulating assembly for deactuating the same and opening the check valve, thereby facilitating an evacuation of air from the system prior to a charging of the same with brake fluid.

According to another feature of our present invention, the valve override includes a first member mounted in the housing for motion substantially transverse thereto and a second member extending longitudinally in the housing from the flow-regulating assembly towards the first valve-override member. The first member is engageable with an end of the second member opposite the flow-regulating assembly for deactuating the same and thereby opening communication between the master cylinder and the wheel cylinder.

The flow-regulating assembly generally includes a sealing disk biased by a restoring spring into contact with a valve seat, the second valve-override member operating according to our present invention to at least partially disengage the disk from the seat. The second member may take the form of a lever attached at one end to the sealing disk and extending therefrom towards the first member, while the same acts to pivot the second member about a point on the seat, thereby partially disengaging the disk therefrom.

According to another feature of our present invention, the flow-regulating assembly includes a plug element biased by an additional restoring spring into a fluid-tight contact with an inner edge of the sealing disk which has an annular shape. In this case the second valve-override member is longitudinally shiftable in the housing and enageable with the plug element at least during a valve-opening stroke of the second member induced by an inward shift of the first member, whereby the plug element is unseatable in opposition to the force exerted by the additional restoring spring.

The first valve-override member may alternatively take the form of a screw or a piston. If a piston, it is slidably mounted in the housing for shifting radially outwardly therein from a valve-overriding position to a neutral position in response to a positive pressure exerted by braking fluid in the check valve upon a filling of the braking system thereby. The friction between the piston and the mating wall of the valve housing is advantageously of such a magnitude as to permit a radially inward shift of the piston from the neutral position to the override position in response to a negative pressure in the braking system due to an evacuation thereof prior to filling with force-transmitting fluid.

According to another particular feature of our present invention, the check valve includes an arrest for limiting the motion of the first override member transverse to the housing. The arrest advantageously takes the form of a radially expanded section of the first member for catching an end of the second override member opposite the flow-regulating assembly.

BRIEF DESCRIPTION OF THE DRAWING

These and other features and advantages of our present invention will now be described in detail, reference being made to the accompanying drawing in which.

SPECIFIC DESCRIPTION

Figure 1:
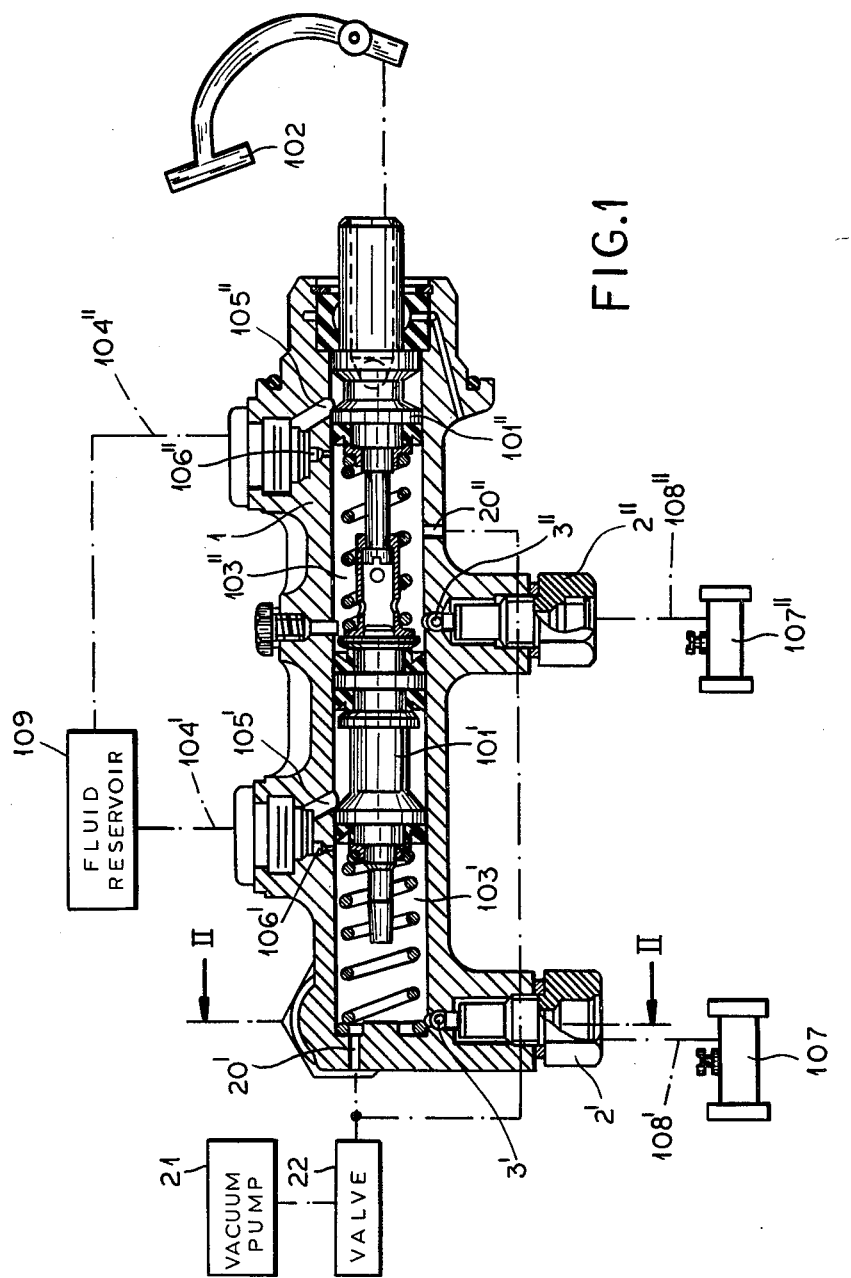
FIG. 1 is a partially schematic longitudinal cross-sectional view of a master brake cylinder incorporating a pair of check valves according to our present invention.

As illustrated in FIG. 1, a dual-chamber master brake cylinder 1 comprises a pair of pistons 101', 101" acting in tandem in response to force exerted by an operator via a brake pedal 102. Each chamber 103', 103" of the master cylinder communicates with a fluid reservoir 109 via respective flow paths 104', 104" including intake ports 105', 105" and bypass ports 106', 106". Chambers 103', 103" are connected to respective pairs of brake cylinders 107', 107" at the wheels (nonillustrated) of an automotive vehicle via fluid-conducting channels 108', 108" in which are inserted check valves 2', 2". According to our present invention these valves are provided with screws or pistons 3', 3" for opening the valves during a charging of the hydraulic systems 1, 103', 103", 104', 104", 107', 107", 108', 108" with brake fluid.

Figure 2:
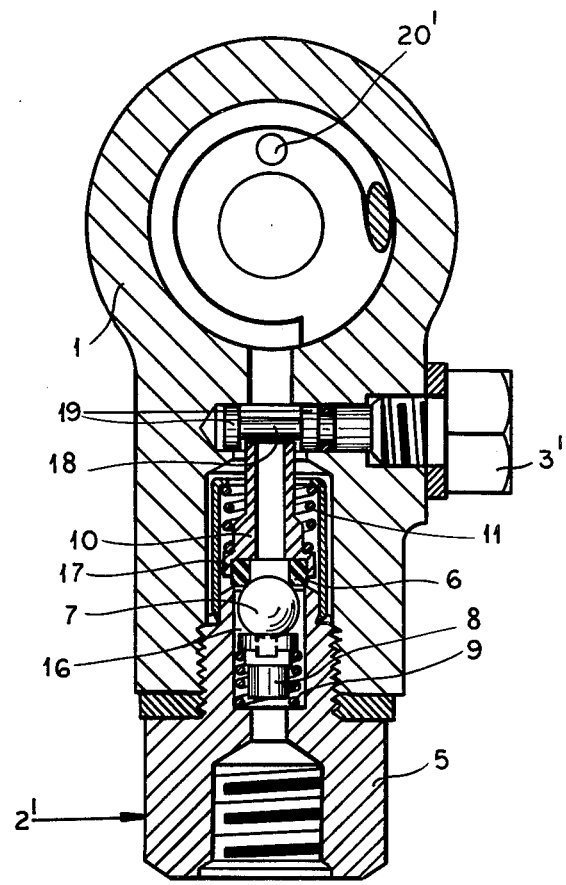
FIG. 2 is a cross-sectional view taken along line II—II in FIG. 1, showing a check valve according to our present invention.
Figure 3:
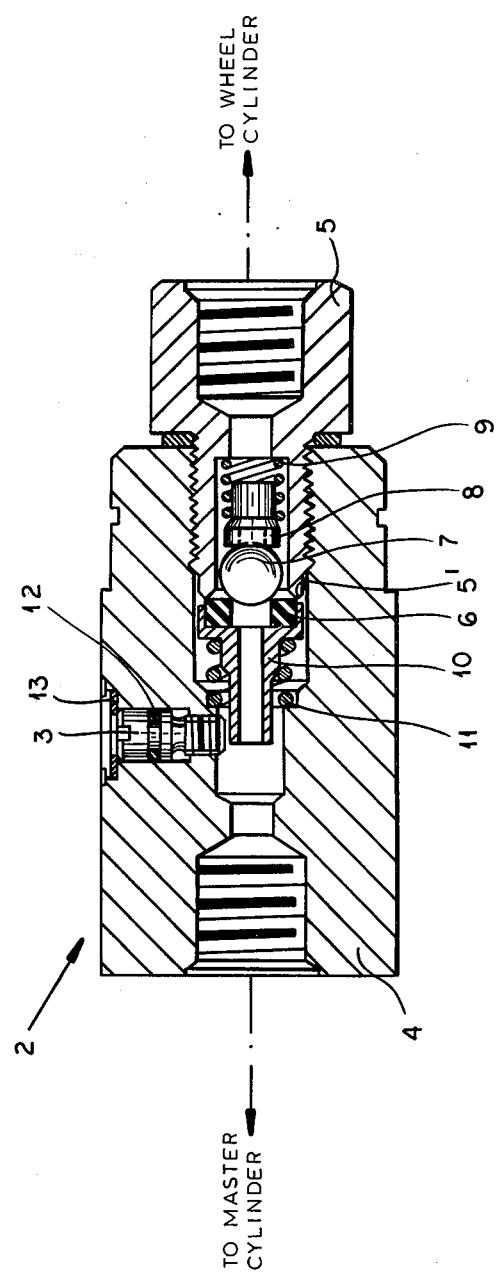
FIG. 3 is a longitudinal cross-sectional view of a check valve in an operating state, similar to the valve shown in FIG. 2.

As shown in FIGS. 2 and 3 check valves according to our present invention may be encased in the master cylinder 1 or may each include its own housing 4. An internally theaded connector piece 5 screwed into cylinder 1 (FIGS. 1 and 2) or into housing 4 has a cylindrical bore or recess 16 carrying a plug element in the form of a sphere 7, a press member or shoe 8 and a restoring spring 9. This restoring spring biases sphere 7 against an inner edge of an annular sealing disk 6 which is in turn biased by another restoring spring 11 into a fluid-tight contact with a rim 5' of connector piece 5.

Disk 6 is mounted in a cup-shaped holder 17 formed as a radially expanded portion of a hollow shaft 10 extending longitudinally through housing 4 from a flow-regulating assembly comprising rim 5', disk 6, spherical plug 7 and restoring springs 9 and 11. Shaft 10 has a free end disposed opposite the flow-regulating assembly and juxtaposed to a screw 3 (or 3' or 3") mounted in housing 4 (or 1) for motion transverse thereto. As shown in FIG. 2, the screw is advantageously formed with a small-diameter segment 18 flanked by a pair of larger-diameter portions 19 which function as arrests or stoppers limiting the axial motion of the screw and coacting with shaft 10 to open the check valve during a charging operation. As an alternative to arrests 19, a washer 13 (FIG. 3) may be mounted in the valve housing at the mouth of the bore traversed by screw 3, washer 13 serving to limit the outward motion of the screw upon a manual rotation thereof.

As illustrated in FIG. 3, valve housing 4 is internally threaded at an end opposite connector 5 for facilitating the linkage of the check valve to a conduit (not shown) communicating with the master cylinder 1. During normal operation of a hydraulic braking system including a check valve according to our present invention, a pressurization of master cylinder 1 (FIG. 1) by an actuation of brake pedal 102 causes spherical plug 7 to unseat itself from the inner rim of disk 6 in opposition to the force exerted by restoring spring 9. Braking fluid then flows from the master cylinder through the check valve 2 (2', 2") to the associated wheel cylinders (107', 107"). Upon a subsequent release of brake pedal 102, plug element 7 reseats itself at least partially under the action of restoring spring 9. The high pressure in the wheel cylinders then forces sealing disk 6 to become disengaged from rim 5' in opposition to the force exerted by restoring spring 11, this spring serving to reclose the check valve prior to an equalization of fluidic pressure in the master cylinder on the one hand and the wheel cylinders on the other hand. Check valve 2 (2', 2") maintains a minimum pressurization of the wheel cylinders connected thereto. It permits a flow of brake fluid to the associated wheel cylinders during an actuating stroke of pedal 102 and partially blocks a return flow from the wheel cylinders to the master cylinder upon a release of the brake pedal.

Figure 4:
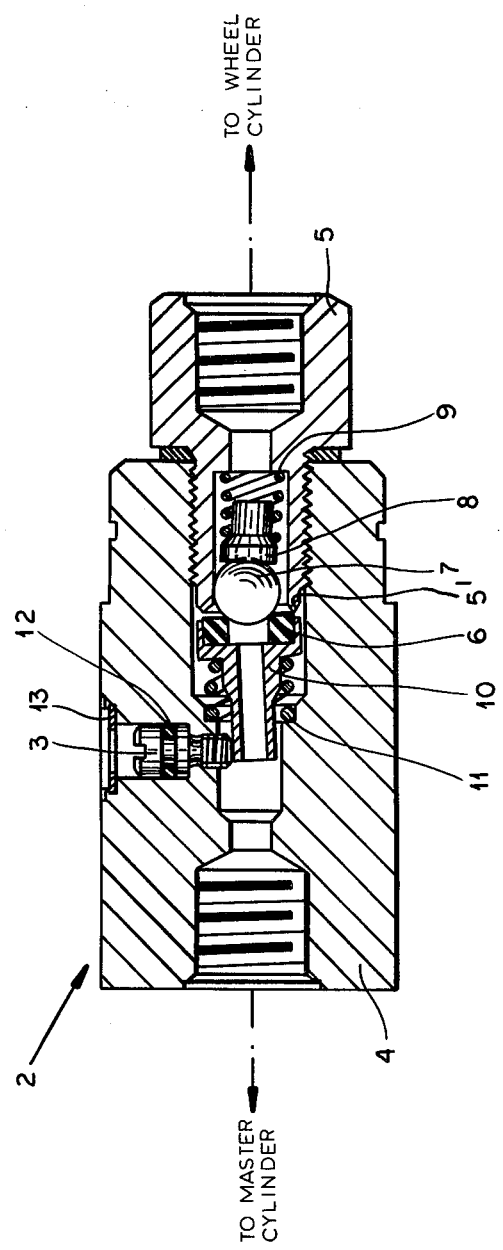
FIG. 4 is a longitudinal cross-section showing the valve of FIG. 3 in an opened or valve-override state.

FIGS. 3 and 4 show valve-overriding screw 3 occupying a neutral or disengaged position and a valve-deactuating position, respectively. Upon a manual turning of the screw shifting the same radially inwardly, the screw tip engages the free end of shaft 10, thereby causing the shaft and the sealing disk 6 to pivot about a point on the valve seat or rim 5'. Shaft 10 thus functions as a valve-overriding lever which unseats disk 6 from rim 5' under the action of screw 3.

The breaking of the seal between disk 6 and rim 5' facilitates an evacuation of air from peripheral parts of the hydraulic braking system, particularly from the wheel cylinders 107', 107" and the conduits 108', 108" leading thereto (see FIG. 1), prior to a charging of the braking system with a force-transmitting fluid. As illustrated in FIG. 1, master cylinder 1 may be provided with air-flow ports 20', 20" connected to a vacuum pump 21 via a manually operable two-position two-way valve 22. Upon an emptying of brake fluid from system 1, 104', 104", 107', 107", 108', 180", for example through wheel cylinders 107', 107", valve 22 may be actuated to link the vacuum pump to brake-cylinder chambers 103', 103" via ports 20', 20". Upon a subsequent screwing-in of value-overriding members 3 (or 3', 3"), negative pressure produced in chambers 103', 103" by the vacuum pump draws residual air from wheel cylinders 107', 107" and conduits 108', 108" (air flowing from right to left in FIG. 4). Alternatively, a check valve according to our present invention is advantageously opened by screw 3 (or 3', 3") and lever 10 prior to an actuation of valve 22 connecting vacuum pump 21 to master-cylinder chambers 103', 103".

Upon an evacuation of air from cylinders 1, 107', 107" and conduits 108', 108", valve 22 is closed. Brake fluid may then be quickly and efficiently introduced into cylinders 1, 107', 107" and conduits 108', 108" from reservoir 109, the negative pressure in the system serving to aid gravity in drawing brake fluid through pressure-transmission conduit 108', 108" to wheel cylinders 107', 107". The entering fluid experiences little or no resistance due to residual air. In addition the fluid need not overcome the force exerted by restoring spring 9.

Upon the completed charging of the hydraulic system with brake fluid, member 3 is shifted from the valve-opening position of FIG. 4 to the neutral position of FIG. 3, whereby a check valve according to our present invention is set in an actuated or operable state.

Figure 5:
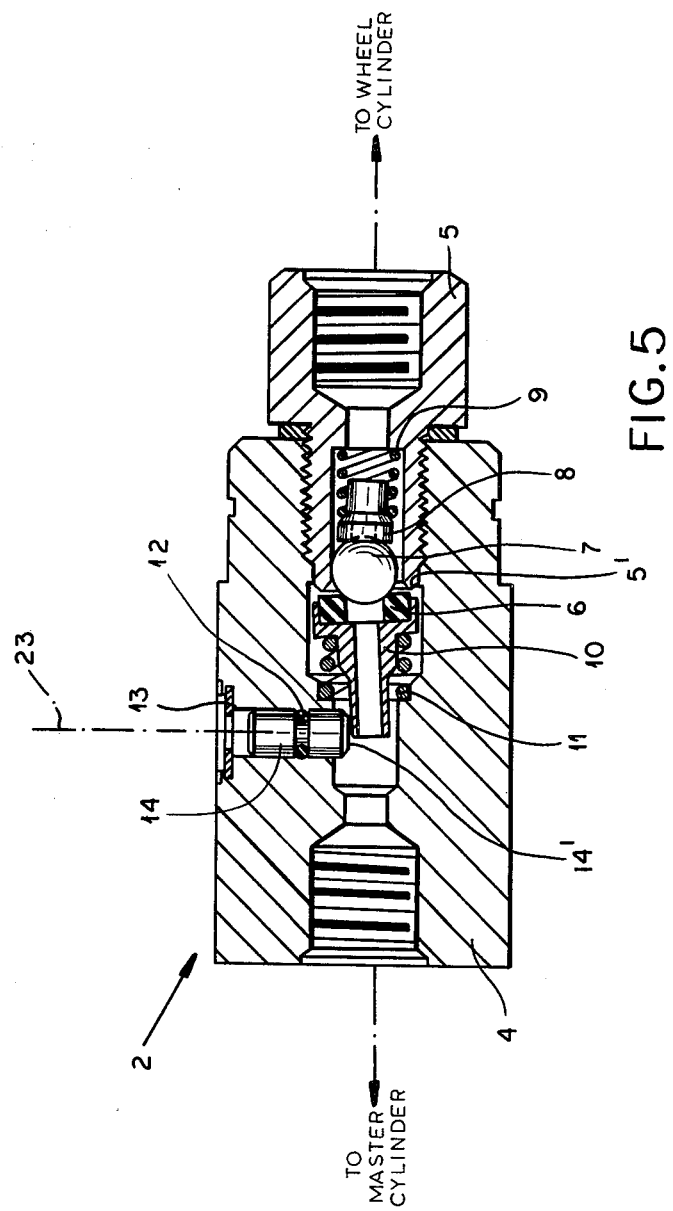
FIG. 5 is a longitudinal cross-sectional view of another check valve according to our present invention, showing the valve in an opened or deactuated state.

As illustrated in FIG. 5, the primary valve-overriding member may take the form of a piston slidably inserted in housing 4 for motion transverse thereto. The piston is shifted radially inwardly by a schematically illustrated push rod 23, whereby a face or end surface 14' of the piston contacts lever 10 to pivot sealing disk 6 about a point on rim 5' in opposition to the force exerted by spring 11. The firction between an outer cylindrical surface of piston 14 and a matching bore surface in housing 4, together with the friction between this bore surface and an O-ring 12 mounted in piston 14, is advantageously of such a magnitude as to be overcome by a positive or overpressure of fluid in the check valve upon a completed filling of the hydraulic system 1, 107', 107'', 108', 108''. Thus piston 14 is automatically shifted from a valve-deactuating position shown in FIG. 5 to a neutral position defined by motion-arresting washer 13. If the friction between the piston (and its O-ring) and the inner housing surface is reduced to an even smaller magnitude, piston 14 may be automatically brought from the neutral position to the valve-overriding position by the negative pressure or vacuum produced in chambers 103', 103'' by pump 21.

Figure 6:
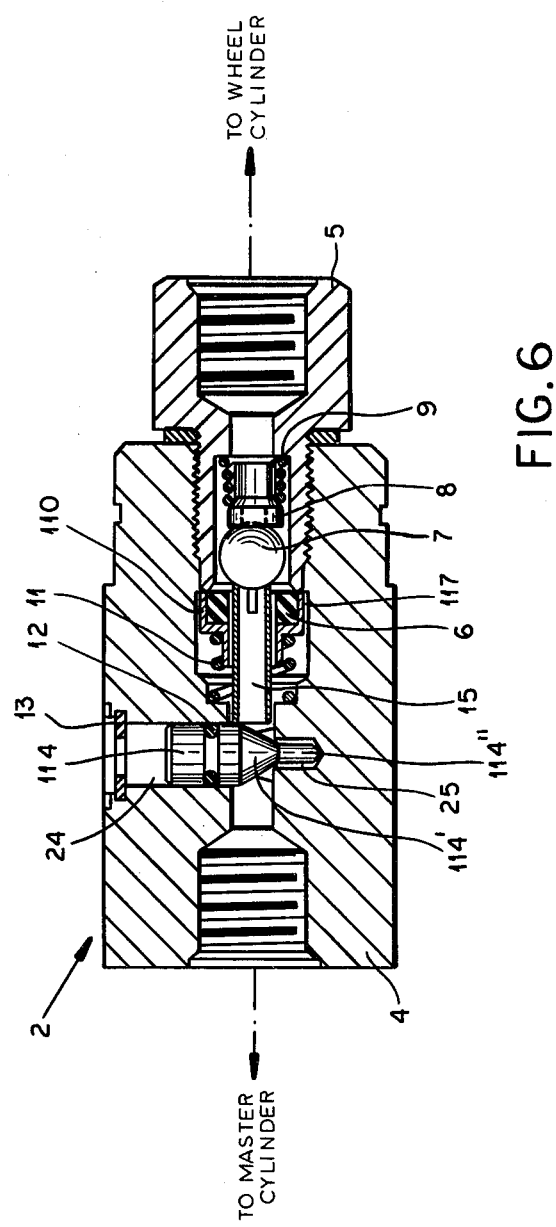
FIG. 6 is a longitudinal cross-sectional view of yet another check valve opened in accordance with our present invention.

As illustrated in FIG. 6, the primary valve-overriding member may take the form of a piston 114 provided with a frustoconical section 114' and a head portion in the shape of a pin 114''. Piston 114 is slidably inserted in a bore 24 for motion substantially transverse to housing 4, pin 114'' extending into a recess 25 formed in housing 4 opposite bore 24. Sealing disk 6 is mounted in a cup-shaped extension 117 of a hollow shaft 110, both disk 6 and shaft 110 being traversed by a tube 15 which engages piston 114 at one end and spherical plug 7 at an opposite end when piston 114 is in the value-overriding position shown in FIG. 6.

While piston 114 is in a neutral position defined by arresting washer 13, spherical plug 7 forms a fluid-tight contact with an inner edge of sealing disk 6 under the action of springs 9 and 11. Tube 15 may float within shaft 110, the longitudinal motion of the tube being limited at the one end by pin 114'' and at the other end by plug element 7. Upon an inward shifting of piston 114 by a nonillustrated push rod, tube 15 engages at one end frustoconical section 114' and is shifted longitudinally thereby in contact with plug element 7. Continued inward motion of piston 114 results in the unseating of the sphere from disk 6 and the consequent opening of the check valve. As heretofore described with reference to FIG. 5, piston 114 may be automatically returned to the neutral position by a fluidic overpressure generated in the check valve upon a filling of system 1, 107', 107'', 108', 108''.

In addition to partially limiting the longitudinal motion of tube 15 during normal operation of a check valve according to our present invention, pin 114'' serves to brace piston 114 against the force exerted by spring 9 via sphere 7 and tube 15 during an overriding of the check valve and to guide, with recess 25, the motion of the piston.

We claim:

1. A check valve inserted between a master cylinder and a wheel cylinder in a hydraulic braking system in an automotive vehicle, said braking system including a brake pedal for enabling the pressurization of said master cylinder by an operator, said valve comprising:

a valve housing;

linkage means for connecting one end of said housing to said master cylinder and another end of said housing to said wheel cylinder;

flow-regulating means in said housing between said one end and said other end for permitting the flow of brake fluid from said master cylinder to said wheel cylinder during a braking stroke of said pedal and for partially blocking a return flow of fluid from said wheel cylinder to said master cylinder upon a release of said pedal; and overriding means mounted in said housing and engageable with said flow-regulating means for deactuating same and opening said valve, thereby facilitating an evacuation of air from said system prior to charging same with brake fluid, said overriding means including a first member mounted in said housing for motion transverse thereto and a second member extending longitudinally in said housing from said flow-regulating means towards said first member, said first member being engageable with an end of said second member opposite said flow-regulating means to deactuate same and open communication between said master cylinder and said wheel cylinder.

2. The valve defined in claim 1 wherein said flow-regulating means includes a sealing disk biased by a restoring spring into contact with a valve seat, said second member operating to at least partially disengage said disk from said seat.

3. The valve defined in claim 2 wherein said second member is a lever attached at one end to said disk and extending therefrom towards said first member, said first member acting to pivot said second member about a point on said seat, thereby partially disengaging said disk therefrom.

4. The valve defined in claim 1 wherein said flow-regulating means includes an annular sealing disk biased by a first restoring spring into a fluid-tight contact with a valve seat and a plug element biased by a second restoring spring into a fluid-tight contact with an inner edge of said disk, said second member being longitudinally shiftable in said housing and engageable with said element at least during a valve-opening stroke of said second member inducted by an inward stroke of said first member, whereby said element may be unseated in opposition to a force exerted by said second restoring spring.

5. The valve defined in claim 3 or 4 wherein said first member is a screw.

6. The valve defined in claim 3 or 4 wherein said first member is in the form of a piston.

7. The valve defined in claim 6 wherein said piston is slidably mounted in said housing for shifting radially outwardly in said housing from a valve-overriding position to a neutral position in response to a positive pressure exerted by braking fluid upon a filling of said system thereby.

8. The valve defined in claim 7 wherein said piston is shiftable radially inwardly in said housing from said neutral position to said valve-overriding position in response to a negative pressure in said system due to an evacuation thereof prior to filling with braking fluid.

9. The valve defined in claim 3 or 4, further comprising arresting means for limiting a motion of said first member transverse to said housing.

10. The valve defined in claim 9 wherein said arresting means includes a radially expanded section of said first member for catching an end of said second member opposite said flow-regulating means.

* * * * *